(12) United States Patent
Yang et al.

(10) Patent No.: US 8,848,038 B2
(45) Date of Patent: Sep. 30, 2014

(54) METHOD AND DEVICE FOR CONVERTING 3D IMAGES

(75) Inventors: Jeonghyu Yang, Seoul (KR); Seungjong Choi, Seoul (KR); Jongchan Kim, Seoul (KR); Jinseok Im, Seoul (KR)

(73) Assignee: LG Electronics Inc., Seoul (KR)

( * ) Notice: Subject to any disclaimer, the term of this patent is extended or adjusted under 35 U.S.C. 154(b) by 586 days.

(21) Appl. No.: 13/180,056

(22) Filed: Jul. 11, 2011

(65) Prior Publication Data

US 2012/0007950 A1 Jan. 12, 2012

Related U.S. Application Data

(60) Provisional application No. 61/362,698, filed on Jul. 9, 2010.

(51) Int. Cl.
*H04N 13/00* (2006.01)
*G06T 7/00* (2006.01)
*H04N 13/02* (2006.01)

(52) U.S. Cl.
CPC ............ *H04N 13/026* (2013.01); *G06T 7/0051* (2013.01); *G06T 2207/20228* (2013.01); *G06T 2207/10016* (2013.01)
USPC ........................................... 348/43; 382/224

(58) Field of Classification Search
USPC ........................................................ 348/43
See application file for complete search history.

(56) References Cited

U.S. PATENT DOCUMENTS

| 7,054,478 | B2 * | 5/2006 | Harman ........................ 382/154 |
| 7,668,377 | B2 * | 2/2010 | Curti et al. .................... 382/224 |
| 7,999,844 | B2 * | 8/2011 | Richards ........................ 348/42 |
| 8,447,096 | B2 * | 5/2013 | Klein Gunnewiek et al. ............................... 382/154 |
| 8,447,141 | B2 * | 5/2013 | Barenbrug .................... 382/298 |
| 8,472,746 | B2 * | 6/2013 | Wei et al. ...................... 382/264 |
| 8,520,935 | B2 * | 8/2013 | Wang et al. ................... 382/154 |
| 2008/0205791 | A1 * | 8/2008 | Ideses et al. .................. 382/285 |
| 2009/0315980 | A1 * | 12/2009 | Jung et al. ...................... 348/43 |
| 2010/0103168 | A1 * | 4/2010 | Jung et al. .................... 345/419 |
| 2010/0165081 | A1 * | 7/2010 | Jung et al. ...................... 348/46 |
| 2011/0069152 | A1 * | 3/2011 | Wang et al. .................... 348/43 |
| 2011/0210969 | A1 * | 9/2011 | Barenbrug .................... 345/419 |

* cited by examiner

*Primary Examiner* — Sath V Perungavoor
*Assistant Examiner* — Howard D Brown, Jr.
(74) *Attorney, Agent, or Firm* — Birch, Stewart, Kolasch & Birch, LLP

(57) ABSTRACT

A method and device for converting 3D images are disclosed herein. The method include the steps of analyzing a 2-dimensional (2D) image and generating 2D image information, generating a global depth and a local depth by using the generated 2D image information, the global depth corresponding to 3D effect pattern information of the 2D image and the local depth corresponding to 3D effect information of an object included in the 2D image, and generating a depth map by using the global depth and the local depth, wherein the depth map corresponds to 3D effect information of the 2D image, and generating a 3D image configured of a left-eye image and a right-eye image by using the 2D image and the depth map.

18 Claims, 16 Drawing Sheets

< 20 >

(1)

(2)

(3)

(4)

(5)

(6)

| A | B | C |
|---|---|---|
| D | E | F |
| G | H | I |

(7)

(1)

(2)

METHOD AND DEVICE FOR CONVERTING 3D IMAGES

This application claims the benefit of the U.S. Provisional Patent Application No. 61/362,698, filed on Jul. 9, 2010, which is hereby incorporated by reference as if fully set forth herein.

BACKGROUND OF THE INVENTION

1. Field of the Invention

The present invention relates to a method and device for converting 3D images and, more particularly, to a method and device for generating a depth map by analyzing 2-dimensional (2D) video data and for converting 2D images to 3-dimensional (3D) images by using the generated depth map.

2. Discussion of the Related Art

With the rapid evolution of recent technology, devices that can playback (or reproduce) diverse 3D image contents are being developed and commercialized. However, due to the limited number of 3D video contents, the users tend to be unable to make full use of the 3D image playback device.

In order to view and enjoy the wanted (or desired) video contents, the users are required to wait until the graphic content providers convert the existing 2D video contents to 3D video contents and release the converted 3D video contents.

Accordingly, in order to allow the users to view and enjoy a wider selection of 3D video contents whenever requested, a method and device for generating 3D video contents and playing-back the generated 3D video contents are required to be developed.

SUMMARY OF THE INVENTION

Accordingly, the present invention is directed to a method and device for converting 3D images that substantially obviate one or more problems due to limitations and disadvantages of the related art.

An object of the present invention is to provide a method and device for converting 3D images that can efficiently convert already-existing 2D video contents to 3D video contents.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for converting 3-dimensional (3D) images includes the steps of analyzing a 2-dimensional (2D) image and generating 2D image information, generating a global depth and a local depth by using the generated 2D image information, the global depth corresponding to 3D effect pattern information of the 2D image and the local depth corresponding to 3D effect information of an object included in the 2D image, and generating a depth map by using the global depth and the local depth, wherein the depth map corresponds to 3D effect information of the 2D image, and generating a 3D image configured of a left-eye image and a right-eye image by using the 2D image and the depth map, and wherein the step of generating a depth map includes generating scene analysis information corresponding to the information on the 3D effect respective to one region of the 2D image, generating the global depth using the scene analysis information, generating object analysis information corresponding to information on an order of diverse 3D effect sizes, and generating the local depth by using the object analysis information.

Also, in the step of generating 2D image information, at least any one of edge information, texture information, color information, blur information, occlusion information, vanishing point information, motion information, and scene change information of the 2D image may be generated.

Also, in the step of generating scene analysis information, the scene analysis information may be generated by detecting a dominant object region having an object displayed therein from the 2D image, by detecting a background region of the 2D image, or by detecting a vanishing point of the 2D image.

Also, in the step of generating scene analysis information, a dominant edge region may be detected from the 2D image by using the edge information, the dominant edge region corresponding to a region having edges distributed therein, a dominant texture region may be detected by using the texture information, the dominant texture region corresponding to a region having texture existing therein, and the dominant object region may be detected by using the dominant edge region information and the dominant texture region information.

Also, in the step of generating scene analysis information, a vanishing line of the 2D image may be detected by using the edge information or border information of the background region and foreground region, and a point where the vanishing lines meet may be detected as the vanishing point.

Also, the global depth may be configured of horizontal 3D effect pattern information of the 2D image and vertical 3D effect pattern information of the 2D image.

Also, in the step of generating a global depth, the global depth may be generated by using a global depth of a previous frame.

Also, the step of generating object analysis information includes any one of detecting a foreground region having the object displayed therein from the 2D image, detecting a background region of the 2D image, and detecting an overlaying status of the object.

Also, the step of generating object analysis information includes differentiating each of the objects of the 2D image from one another by using the edge information or the texture information.

Also, the step of generating a 3D image includes shifting a pixel of the 2D image as much as the depth map value, and generating the left-eye image or the right-eye image, and determining pixel information in pixels of the left-eye image and/or the right-eye image by using pixel information of a neighboring pixel.

In another aspect of the present invention, a device for converting 3-dimensional (3D) images includes a 2D image analysis module configured to analyze a 2-dimensional (2D) image and to generate 2D image information, a depth map generator configured to generate a global depth and a local depth by using the generated 2D image information, the global depth corresponding to 3D effect pattern information of the 2D image and the local depth corresponding to 3D effect information of an object included in the 2D image, and to generate a depth map by using the global depth and the local depth, wherein the depth map corresponds to 3D effect information of the 2D image, and a view synthesis module configured to generate a 3D image configured of a left-eye image and a right-eye image by using the 2D image and the depth map. And, herein, the depth map generator generates scene analysis information corresponding to the information on the 3D effect respective to one region of the 2D image, generates the global depth using the scene analysis information, generates object analysis information corresponding to information on an order of diverse 3D effect sizes, and generates the local depth by using the object analysis information.

Also, the 2D image analysis module may generate at least any one of edge information, texture information, color information, blur information, occlusion information, vanishing point information, motion information, and scene change information of the 2D image.

Also, the depth map generator may generate the scene analysis information by detecting a dominant object region having an object displayed therein from the 2D image, by detecting a background region of the 2D image, or by detecting a vanishing point of the 2D image.

Also, the depth map generator may detect a dominant edge region from the 2D image by using the edge information, the dominant edge region corresponding to a region having edges distributed therein, and the depth map generator may detect a dominant texture region by using the texture information, the dominant texture region corresponding to a region having texture existing therein, and the depth map generator may detect the dominant object region by using the dominant edge region information and the dominant texture region information.

Also, the depth map generator may detect a vanishing line of the 2D image by using the edge information or border information of the background region and foreground region, and a point where the vanishing lines meet may be detected as the vanishing point.

Also, the global depth may be configured of horizontal 3D effect pattern information of the 2D image and vertical 3D effect pattern information of the 2D image.

Also, the depth map generator may generate the global depth by using a global depth of a previous frame.

Also, the depth map generator may generate the object analysis information by detecting a foreground region having the object displayed therein from the 2D image, by detecting a background region of the 2D image, or by detecting an overlaying status of the object.

Also, the depth map generator may differentiate each of the objects of the 2D image from one another by using the edge information or the texture information.

Also, the view synthesis module may shift a pixel of the 2D image as much as the depth map value, so as to generate the left-eye image or the right-eye image, and may determine pixel information in pixels of the left-eye image and/or the right-eye image by using pixel information of a neighboring pixel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In addition, although the terms used in the present invention are selected from generally known and used terms, the terms used herein may be varied or modified in accordance with the intentions or practice of anyone skilled in the art, or along with the advent of a new technology. Alternatively, in some particular cases, some of the terms mentioned in the description of the present invention may be selected by the applicant at his or her discretion, the detailed meanings of which are described in relevant parts of the description herein. Furthermore, it is required that the present invention is understood, not simply by the actual terms used but by the meaning of each term lying within.

The suffixes "module" and "unit" that are mentioned in the elements used to describe the present invention are merely used for the purpose of simplifying the description of the present invention. Therefore, the suffixes "module" and "unit" may also be alternately used for the reference of a specific element of the present invention.

As a method for providing 3D images to the user, binocular disparity providing 3D effects (or cubic effects) may be used by viewing a single object through each of a left eye and a right eye from different directions.

Accordingly, the 2D image having binocular disparity is separately outputted to the left eye and the right eye. Then, by using special glasses, such as polarized light filter glasses, the left-side image and the right-side image can be alternately exposed to the left eye and the right eye, thereby providing the 3D image to the user.

Therefore, the 3D image according to the present invention may be configured of a left-eye image and a right-eye image. The left-eye image corresponds to an image viewed by the user from the left-side perspective, and the right-eye image corresponds to an image viewed by the user from the right-side perspective.

Subsequently, the device for playing-back 3D images sequentially reads the above-described left-eye image and the right-eye image and, then, decodes the read images to a single 3-dimensional (3D) image. The decoded 3D image is outputted to the user through a displayer of the device for playing-back 3D images. Thereafter, the user puts on special glasses, such as polarized light filter glasses, thereby being capable of viewing and enjoying 3D images.

Although an example of a stereoscopic method requiring the use of special glasses is described in the above-description, the present invention may also be applied to an autostereoscopic method.

Figure 1:
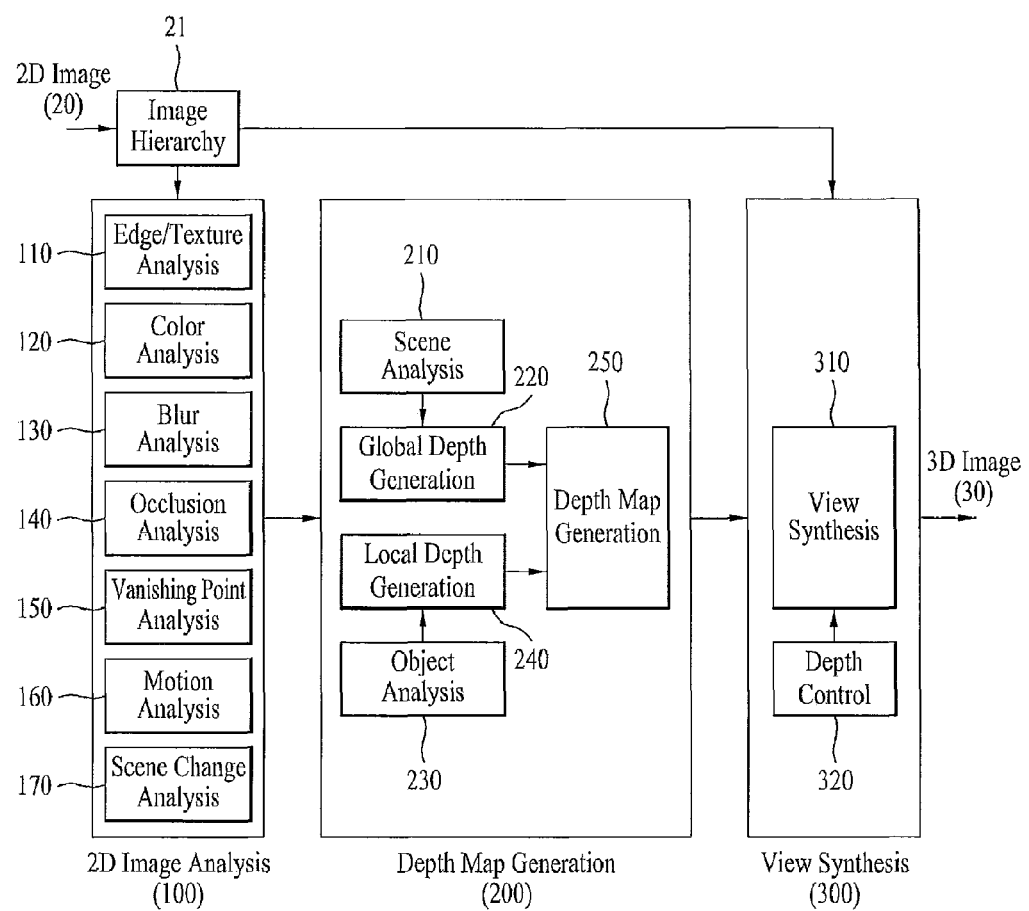
FIG. 1 illustrates a general flow chart of a method for converting 3D images according to an embodiment of the present invention.

FIG. 1 illustrates a general flow chart of a method for converting 3D images according to an embodiment of the present invention.

As shown in FIG. 1, the method for converting 3D images includes the steps of 2D image analysis (100), depth map analysis (200), and view synthesis (300).

First of all, in the step of 2D image analysis (100), edge/texture analysis 110, color analysis 120, blur analysis 130, occlusion analysis 140, vanishing point analysis 150, motion analysis 160, scene change analysis 170, and so on, of a 2D image (20) are performed.

The step of 2D image analysis (100) corresponds to a step of analyzing a position of a scene, which configures the 2D image (20), and positions of one or more objects, and analyzing a format in which the scene and objects are expressed. Accordingly, the present invention may use the 2D image analysis information so as to deduce 3-dimensional (3D) effect (or cubic effect) information of the scene and objects corresponding to the 2D image (20).

The edge/texture analysis 110 determines how an edge and texture of the 2D image (20) is configured. This will be described in more detail with reference to FIG. 4 and FIG. 5.

The color analysis 120 determines how the colors of the 2D image (20) are distributed.

The blur analysis 130 determines which portion of the 2D image (20) is focused and which portion of the 2D image is defocused. Accordingly, the focused portion has a relatively greater 3D effect, and the defocused portion of the 2D image (20) has a relatively smaller 3D effect.

The occlusion analysis 140 determines overlaying status (or occlusion) between the objects of the 2D image (20). Herein, underlaying objects are determined to display a smaller 3D effect as compared to the overlaying objects.

The vanishing point analysis 150 determines a portion where the vanishing point of the 2D image (20) is located. The portion of the 2D image (20) having the vanishing point may display a relatively smaller 3D effect.

The motion analysis 160 determines an amount (or degree) of motion of each object. More specifically, during a same time period, objects with greater motions display a relatively greater 3D effect, and objects with smaller motions display a relatively smaller 3D effect.

The scene change analysis 170 determines whether or not a scene change exists between a previous frame and a current frame. For example, during a scene, since a large (or significant) change in 3D effects between objects does not occur, the 3D effect of each object may be determined based upon the 3D effect of the objects belonging to the previous frame. However, when a scene change occurs, the 3D effect information of the objects belonging to the previous scene cannot be used.

In the step of depth map generation (200), a depth map is generated by using the analysis information acquired during the above-described step of 2D image analysis (100). The depth map according to the present invention corresponds to information indicating the 3D effect of a scene and objects of the 2D image (20).

First of all, in the step of depth map generation (200), a global depth is generated by performing scene analysis 210, and a local depth is generated by performing object analysis 230. Thereafter, the depth map of the 2D image (20) is generated by using the generated global map and local map.

The global map corresponds to information on a 3D effect pattern belonging to the 2D image (20). More specifically, for example, the global depth corresponds to information determining whether or not the 2D image (20) is configured of a pattern displaying a smaller 3D effect at the upper portion of the image and displaying a greater 3D effect along a downward direction towards the lower portion of the 2D image (20). The global depth will be described in more detail with reference to FIG. 8.

Furthermore, the local depth corresponds to individual 3D effect information of each object configuring the 2D image (20). More specifically, the local depth indicates an order of 3D effect sizes between each of the objects.

In the step of view synthesis (300), after modifying the depth map by performing depth control 320, the depth map is applied to the 2D image (20), so as to generate a 3D image. More specifically, a left-sided image and a right-sided image.

Hereinafter, each of the above-described process steps will be described in more detail.

Figure 2:
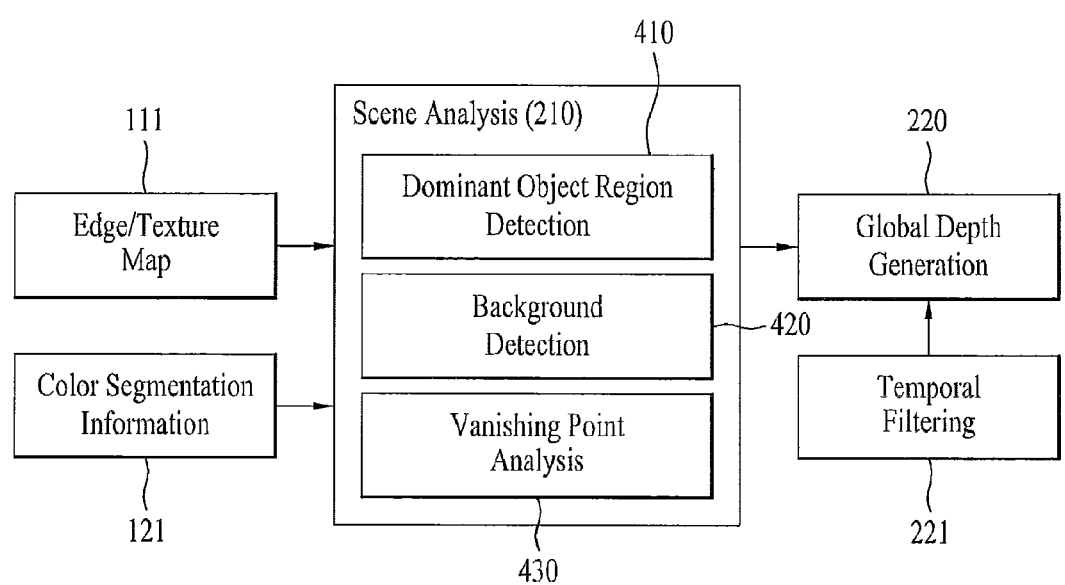
FIG. 2 illustrates a flow chart of a scene analysis method according to the embodiment of the present invention.

FIG. 2 illustrates a flow chart of a scene analysis method (210) according to the embodiment of the present invention.

First of all, the present invention performs scene analysis (210) by using the edge/texture information (i.e., edge/texture map 111) and color segmentation information 121, which are acquired during the step of 2D image analysis (100).

The process of scene analysis (210) determines the portion where the object, background, vanishing point, and so on, of the 2D image (20) are located. In other words, the scene analysis (210) analyzes the entire scene of the 2D image (20). Accordingly, the scene analysis (210) determines which part of the 2D image (20) displays a greater 3D effect, and which part of the 2D image (20) displays a smaller 3D effect.

The scene analysis (210) may also be performed through dominant object region detection 410, or background detection 420, or vanishing point analysis 430.

First of all, in the dominant object region detection 410 process, a foreground region of the 2D image (20) is detected. The foreground region corresponds to the region where the objects exist. Accordingly, the present invention may determine the region having a highly intense and dense edge or texture as the dominant object region from the edge/texture map 111. The dominant object region detection 410 process will be described in more detail later on with reference to FIG. 3.

Also, in the background detection 420 process, a region having no edge or texture or a region having a weak edge or texture is detected from the edge/map texture 111. Furthermore, regions indicating the sky, the ground, grass, and so on, are detected from the color segmentation information 121. Thus, the background region of the 2D image (20) is detected.

The background detection 420 process will be described in more detail later on with reference to FIG. 6.

Furthermore, the vanishing point analysis 430 process detects vanishing lines and vanishing points of the 2D image (20). The present invention extracts dominant lines of the 2D image (20) by using methods, such as Hough transform, from the edge/texture map 111. And, the point where the dominant lines meet may be determined as the vanishing point. At this point, unnecessary lines may be filtered out by using the color segmentation information 121. Then, the lines configured of edges that are located at the borders of the background region and the foreground region may configure the vanishing line.

Based upon the information on the scene that is obtained by performing the above-described scene analysis (210) process, the present invention performs the global depth generation 220 process. More specifically, the present invention uses the information on the corresponding scene, so as to generate the global depth, which corresponds to 3D effect pattern information of the 2D image (20). The global depth will be described in more detail with reference to FIG. 8.

Also, according to the embodiment of the present invention, in order to allow a smooth change in 3D effect to be performed between each of the image frames, the present invention uses the global depth generated from the previous frame so as to perform temporal filtering, thereby generating a final global depth.

Moreover, the present invention may perform the scene analysis (210) process by using any one of the above-described three methods, or by using a combination of two or more of the above-described three methods.

For example, the present invention may configure a scene by extracting a linear perspective direction of the 2D image (20) and the respective information by using only the vanishing line/point information that is obtained from the vanishing point analysis 430 process. Also, the present invention may also configure a scene that is divided into a background and a foreground by using only the background region information, which is obtained from the background detection 420 process. Additionally, the present invention may also extract a main location or a main viewing point/viewing angle region from a scene, by using only the dominant object region information that is obtained from the dominant object region detection 410 process. Furthermore, a more detailed scene may be configured by adequately combining the above-described three different types of information.

Figure 3:
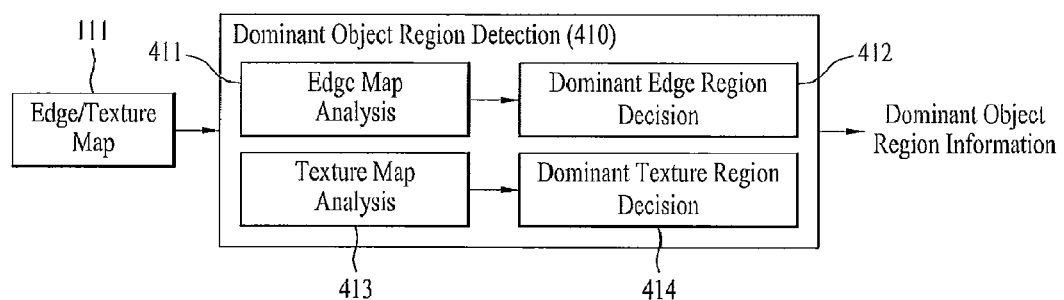
FIG. 3 illustrates a flow chart of a dominant object region detection method according to the embodiment of the present invention.

FIG. 3 illustrates a flow chart of a dominant object region detection (410) method according to the embodiment of the present invention.

The dominant object region detection (410) method may consist of a process of performing edge map analysis 411 and dominant edge region decision 412 and a process of performing texture map analysis 413 and dominant texture region decision 414.

More specifically, in the dominant object region detection (410) method, a dominant object region may be detected by using an edge map of the 2D image (20), and a dominant object region may also be detected by using a texture map of the 2D image (20).

Figure 8:
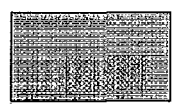
FIG. 8 illustrates a global depth model according to the embodiment of the present invention.
Figure 8:
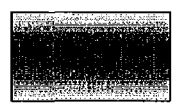
Figure 8:
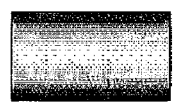
Figure 8:
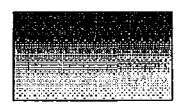
Figure 8:
Figure 8:
Figure 8:
Figure 8:
Figure 8:

Furthermore, the global depth model, which will be described in more detail with reference to FIG. 8, is determined based upon the detected dominant object region.

Hereinafter, a method of detecting the dominant region using the edge/texture map 111 will be described in detail.

Figure 4:
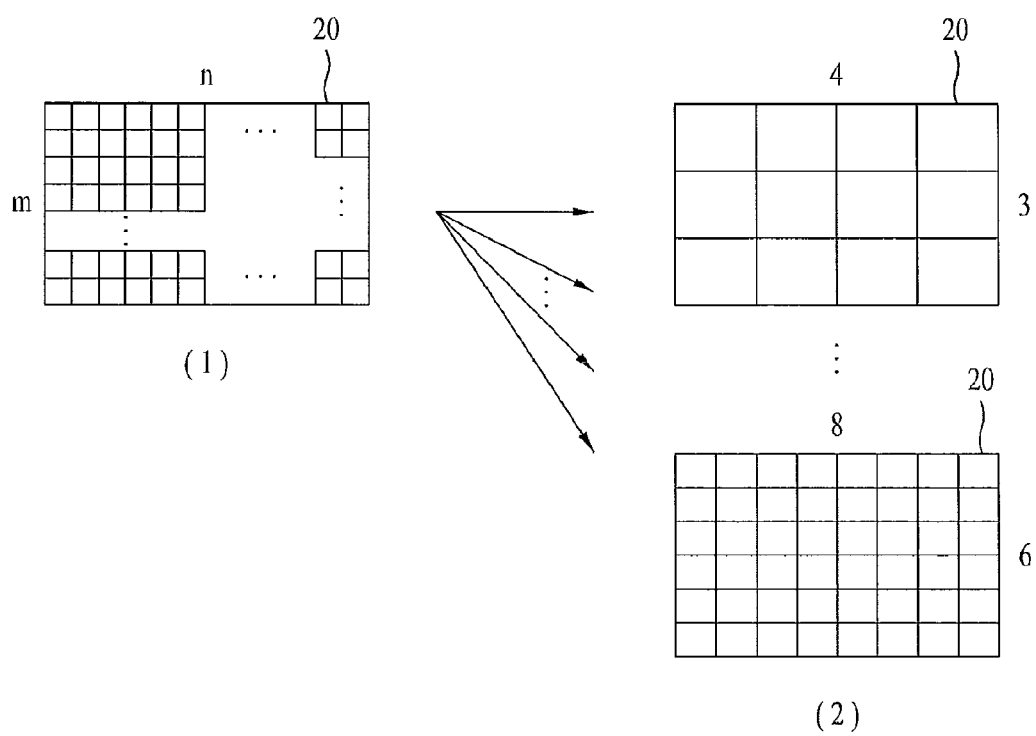
FIG. 4 and FIG. 5 illustrate a dominant object region detection method by using an edge/texture map according to the embodiment of the present invention.
Figure 5:
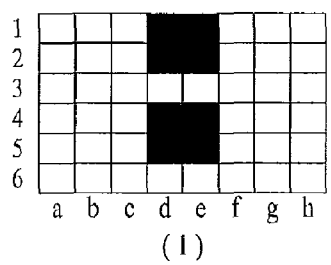
Figure 5:
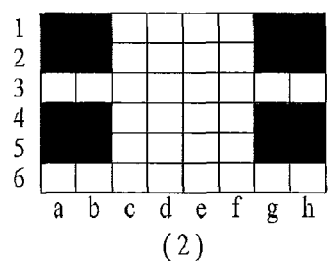
Figure 5:
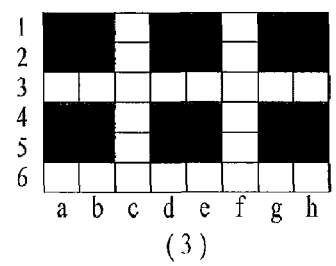
Figure 5:
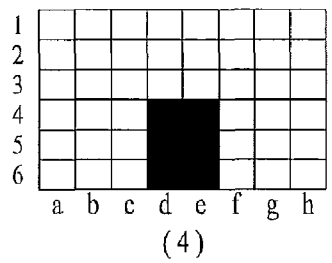
Figure 5:
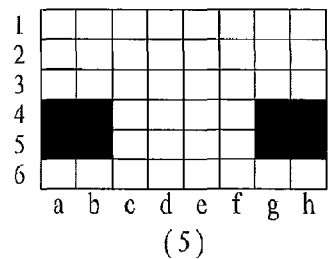
Figure 5:
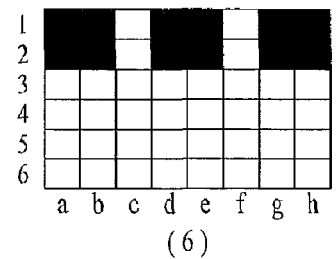

FIG. 4 and FIG. 5 illustrate a dominant object region detection (410) method by using an edge/texture map according to the embodiment of the present invention.

The edge map and the texture map will first be described. When a 2D image (20) is divided into predetermined regions, the edge map corresponds to information indicating whether or not an edge exists in each region. Also, when a 2D image (20) is divided into predetermined regions, the texture map corresponds to information indicating whether or not a texture exists in each region.

For example, referring to one block of the 2D image (20) shown in FIG. 4, the edge map corresponds to information indicating whether or not an edge exists, wherein the edge is drawn by applying the Sobel/Laplacian/Canny masks within each block, and the texture map correspond to information indicating whether or not a texture exists, wherein the texture is determined based upon the distribution of pixel values within each block.

As shown in (2) of FIG. 4, in order to perform the dominant edge/texture region decision 412 and 414, the above-described edge map and texture map may be reconfigured in a macro block format.

Edge/texture map analysis 411 and 413 correspond to a process of extracting edge/texture map 111 in the macro block format shown in (2) of FIG. 4 from the edge/texture map 111 shown in (1) of FIG. 4. Thereafter, the present invention performs dominant edge region decision 412 and dominant texture region decision 414 by using the extracted edge/texture map 111.

FIG. 5 illustrates an exemplary dominant edge region decision (412) process and an exemplary dominant texture region decision (414) process.

As shown in (7) of FIG. 5, the present invention divides a horizontal area of the 2D image (20) into three regions, i.e., left, center, and right regions, and the present invention also divides a vertical area of the 2D image (20) into three regions, i.e., up, center, and down regions, thereby dividing the 2D image (20) into 9 different regions. In the description of the present invention, each of the 9 regions will be referred to as region A to region I, as shown in FIG. 5.

Accordingly, in case of the 2D image (20) shown in (1) of FIG. 5, it is decided that the edge/texture exists in regions B and E or in regions B and H, or regions B, E, and H. And, in case of the 2D image (20) shown in (2) of FIG. 5, it is decided that the edge/texture exists in (regions A and D or regions A and G or regions A, D, and G) and in (regions C and F, regions C and I, or regions C, F, and I).

Also, in case of the 2D image (20) shown in (4) of FIG. 5, it will be decided that the edge/texture exists in region E, or region H, or regions E and H. Similarly, the dominant edge/texture region decision (412) and (414) may be performed on the remaining examples of the 2D image (20) shown in FIG. 5, by using the above-described method.

In a method simpler than the above-described method, dominant edge/texture region decision may be performed by dividing the 2D image (20) into three regions only along the horizontal direction and not along the vertical direction.

Accordingly, the present invention may use the edge/texture region information of the above-described 2D image (20) as a factor for deciding the optimal global depth model in the global depth generation (220) process.

Figure 6:
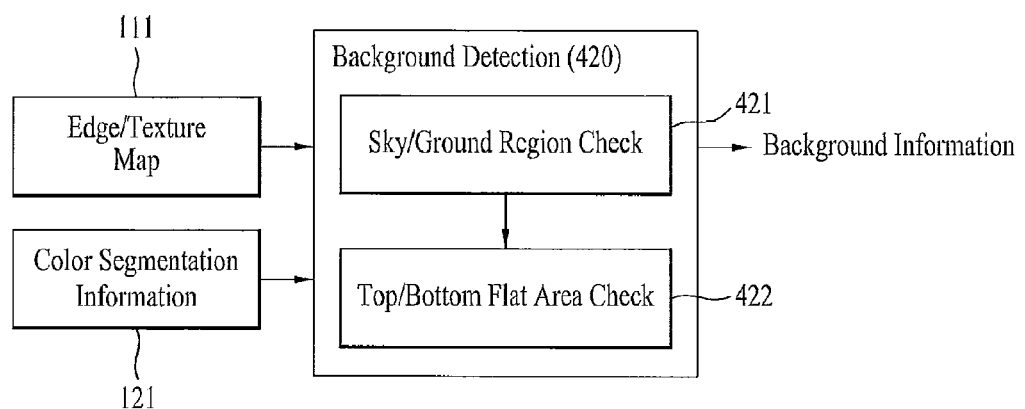
FIG. 6 illustrates a flow chart of a background detection method according to the embodiment of the present invention.

FIG. 6 illustrates a flow chart of a background detection (420) method according to the embodiment of the present invention.

The background decision (420) method corresponds to a method of detecting a background of the 2D image (20). Herein, the present invention performs background decision (420) by performing a sky/ground region check 421 process and a top/bottom flat area check 422 process, so as to detect the background of the 2D image (20).

During the sky/ground region check 421 process, the present invention detects a sky region or a ground region from the edge/texture map 121 and the color segmentation information 121.

More specifically, during the sky/ground region check 421 process, a region of the 2D image (20) having no edge or having a very weak edge or a region having the color of the sky and/or the ground may be determined as the background of the 2D image (20).

Furthermore, in the tom/bottom flat area check 422 process, a region having no edge and no texture is detected from the top and/or bottom area of the 2D image. And, the detected area may be determined as the background of the 2D image (20).

Figure 7:
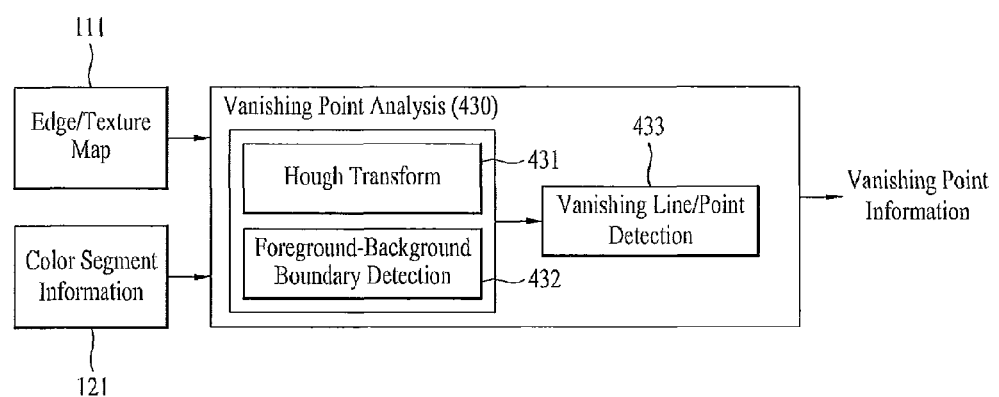
FIG. 7 illustrates a flow chart of a vanishing point analysis method according to the embodiment of the present invention.

FIG. 7 illustrates a flow chart of a vanishing point analysis (430) method according to the embodiment of the present invention.

The vanishing point analysis (430) method corresponds to a method of detecting a vanishing point of the 2D image (20). Herein, the vanishing point analysis (430) method is configured to perform a Hough transform 431 process, a foreground-background boundary detection 432 process, and a vanishing line/point detection 433 process.

First of all, in the vanishing point analysis (430) method, a Hough transform is applied to the edge map 111, so as to locate straight lines of the 2D image (20). This step corresponds to the Hough transform 431 process.

Then, in the vanishing point analysis (430) method, boundaries of the foreground and the background are detected, so as to eliminate (or remove) the inside of an object or the texture region. This step corresponds to the foreground-background boundary detection 432 process.

Subsequently, by using the straight lines detected from the Hough transform 431 process and the boundary lines detected from the foreground-background boundary detection 432 process, the present invention may locate the vanishing lines of the 2D image (20) and a vanishing point where the located vanishing lines meet. This step corresponds to the vanishing line/point detection 433 process.

By analyzing the vanishing point of the 2D image (20), the present invention may be aware of a linear perspective scene of the 2D image (20).

Accordingly, by using the scene information of the 2D image (20), which is obtained by performing the above-described dominant object region detection (410), background detection (420), or vanishing point analysis (430) process, the present invention may obtain the global depth model of the 2D image (20).

The global depth model corresponds to information on the 3D effect pattern according to which the 2D image (20) should be expressed.

During the global depth generation (220) process, the present invention may use the scene information deduced from the above-described scene analysis 210 process, i.e., the present invention may use the dominant object region information, the background information, and the vanishing point information, so as to locate the global depth model best-fitting (or best-matching) the current scene.

FIG. 8 illustrates a global depth model according to the embodiment of the present invention.

First of all, in the global depth map of FIG. 8, the brighter portion indicates that the 3D effect is greater, and the darker portion indicates that the 3D effect is smaller.

As described above, the global depth model corresponding to 3D effect pattern information of the 2D image (20). And, herein, global depth models having diverse patterns may exist.

For example, a global depth model varying along the vertical direction may exist, as shown in (1) of FIG. 8, and a global depth model varying along the horizontal direction may exist, as shown in (2) of FIG. 8. Furthermore, by combining the global depth model varying along the vertical direction and the global depth model varying along the horizontal direction, a wider range of global depth models may be generated.

The global depth generation (220) method corresponds to a method of using diverse scene analysis information so as to select the above-described global depth model.

For example, by using the dominant object region information, the present invention may select a global depth model, which is configured so that the portion corresponding to the dominant object region can display a greater 3D effect.

Also, by using the background information, the present invention may select a global depth model, which is configured to have the foreground region display a greater 3D effect and configured to have the background region display a smaller 3D effect.

Furthermore, by using the vanishing point information, the present invention may select a global depth model, wherein the vanishing point is configured of a convergence point of vertical and/or horizontal 3D effects.

Therefore, by using the above-described information, the present invention may select a vertical global depth model or a horizontal global depth model.

Accordingly, a global depth model, which is selected by performing scene analysis (210) on a 2D image (20), may be varied temporally discontinuously or discretely for each frame. Therefore, when a scene change does not occur, since the scene varies smoothly and continuously, it is preferable to perform temporal filtering (221) by referring to the global depth model obtained from the previous frame image. When a scene change occurs abruptly, an abrupt change in the 3D effect occurs accordingly, and since the viewer's ability to adjust focus cannot catch up with the abrupt change, this may cause the viewer to experience visual fatigue. Therefore, it is preferable to smoothly change the 3D effect.

As an example of the temporal filtering (221) process, by referring to a frequency level of a global depth model, which is independently selected in the previous frame, a global depth model of the current frame can be selected. When it is assumed that a number of global depth models is equal to N, and when it is assumed that a frequency level of a $k^{th}$ global depth model (Dk), which is decided from M number of previous frames including the current frame, is equal to Wk, a final global depth model (Dg) for the current frame image may be obtained by using Equation 1 shown below.

$$D_g = \frac{1}{M}\sum_{k=1}^{N} w_k D_k, \quad \sum_{k=1}^{N} w_k = M \qquad \text{Equation 1}$$

In the above description, a method for obtaining a global depth has been described. Hereinafter, a method for obtaining a local depth will now be described in detail.

Figure 9:
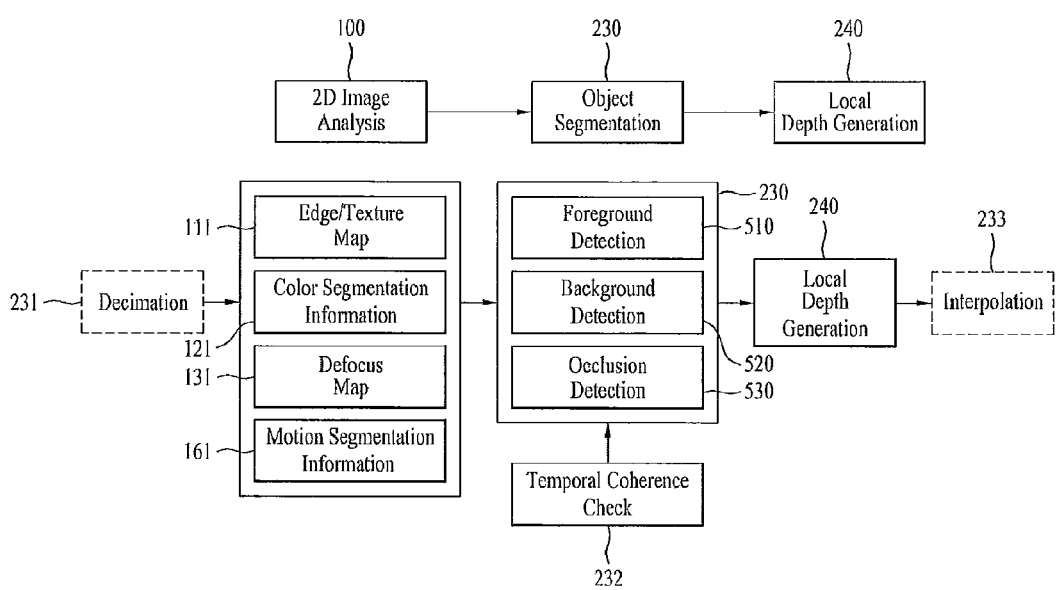
FIG. 9 illustrates a flow chart of a local depth generation method according to the embodiment of the present invention.

FIG. 9 illustrates a flow chart of a local depth generation (240) method according to the embodiment of the present invention.

As shown in FIG. 9, the method for obtaining a local depth of the 2D image (20) includes a 2D image analysis 100 process, an object segmentation 230 process, and a local depth generation 240 process. Examples of the information on the 2D image (20) include an edge/texture map 111, color segmentation information 121, a defocus map 131, and motion segmentation information 161.

The defocus map 131 corresponds to information determining which portion of the 2D image (20) is focused and which portion of the 2D image (20) is defocused. And, the motion segmentation information 161 corresponds to information indicating an amount (or degree) of motion of each object.

The present invention divides the objects of the 2D image (20) by using the 2D image analysis information. This process is referred to as the object segmentation 230 process. Thereafter, the divided objects are assigned (or allocated) with a local depth, which corresponds to the information on each 3D effect, based upon the information on the respective objects. This process is referred to as the local depth generation 240 process.

The object segmentation 230 process divides the objects of the 2D image by performing a foreground detection 510 process, a background detection 520 process, and an occlusion detection 530 process.

The foreground detection 510 process corresponds to the process of detecting a foreground, which corresponds to a region distributing the objects. As described above, the present invention may use the edge/texture map 111. Furthermore, the present invention may also use an edge/texture map 111, which is obtained by performing decimation 231 on the 2D image (20). The decimated edge/texture map 111 fills flat areas within the object, thereby increasing the efficiency in foreground detection.

For example, the foreground region may be indicated in the form of a binary map, by checking the presence and/or absence of edge/texture distribution in block units having a predetermined size, and the foreground region may also be indicated by a value indicating the edge/texture size.

The background detection 520 process corresponds to a process of detecting a background of the 2D image (20). As described above, a region having no edge/texture or a region having a weak edge/texture may be determined as the background. Also, since the background generally includes the edge of the 2D image (20), the present invention may detect the background by analyzing the edge/texture map ill and the color segmentation information 121 near the edge portion of the 2D image (20).

For example, when the 2D image (20) corresponds to a nature image or an outdoor image, the sky is mostly indicated in the upper region of the image. Accordingly, the present invention may extract an upper region, which corresponds to a region being configured of a sky blue color distribution. Conversely, when the 2D image (20) corresponds to a sports image, grass or ice is distributed at the lower portion of the 2D image (20). Therefore, the present invention may analyze the color segmentation information 121, so as to extract a lower portion of the 2D image configured of a color distribution of a green color group or a white color group, and to extract the corresponding region as the background.

The occlusion detection 530 process corresponds to a process of determining the overlay status of the objects. Herein, by using the edge/texture map 111, the color segmentation information 121, and the motion segmentation information 161, cases when the edge/texture/color/motion is divided within a specific portion of the 2D image (20) may be detected. Thus, the overlay status of the objects may be determined.

Additionally, the present invention may use the defocus map 131 so as to divide the 2D image (20) into a focused region and a defocused region. For example, since only a specific object is focused, and since the remaining regions are defocused, the focused object may display a greater 3D effect as compared to the other objects.

Also, in order to prevent depth flickering, which corresponds to a large change in 3D effect size of the objects, from occurring, the present invention may perform temporal coherence 232. For example, the present invention may detect a scene change, and, when the scene change is not large (or significant), the present invention may be controlled so that the 3D effect size of the objects can remain unchanged.

Therefore, by using the above-described method, the present invention detects the background region and the foreground region, so as to hierarchically divide the objects of the foreground based upon the respective 3D effect size.

During the local depth generation 240 process, the detected background and foreground regions and the hierarchically divided objects are aligned by an order of the 3D effect. And, a local depth may be allocated in accordance with the alignment order. More specifically, a greater local depth value may be determined with respect to the alignment order.

Additionally, during the local depth generation 240 process, the 2D image (20) is divided into a background layer and a foreground layer. And, the local depth size for each layer may be determined so that the local depth size of the foreground layer can be larger, and so that the local depth size of the background can be smaller.

Furthermore, in case of the background layer, if the background distributed in the upper portion of the image is different from the background distributed in the lower portion of the image, it will be more effective to assign different local depth values for each portion of the background. For example, a smaller local depth value may be assigned to the upper background, and a greater local depth value may be assigned to the lower background.

In the foreground layer the local depth shall be determined for each of the actual objects. The present invention may sequentially determine a local depth for each object in accordance with an alignment order of the objects, the objects being aligned by the above-described object segmentation 230 process.

Finally, when the local depth is obtained by using the decimated 2D image (20), the local depth should be interpolated to the resolution of the original image. This process is referred to as the interpolation 233 process.

Hereinafter, detailed methods of the object segmentation 230 process will now be described in detail.

Figure 10:
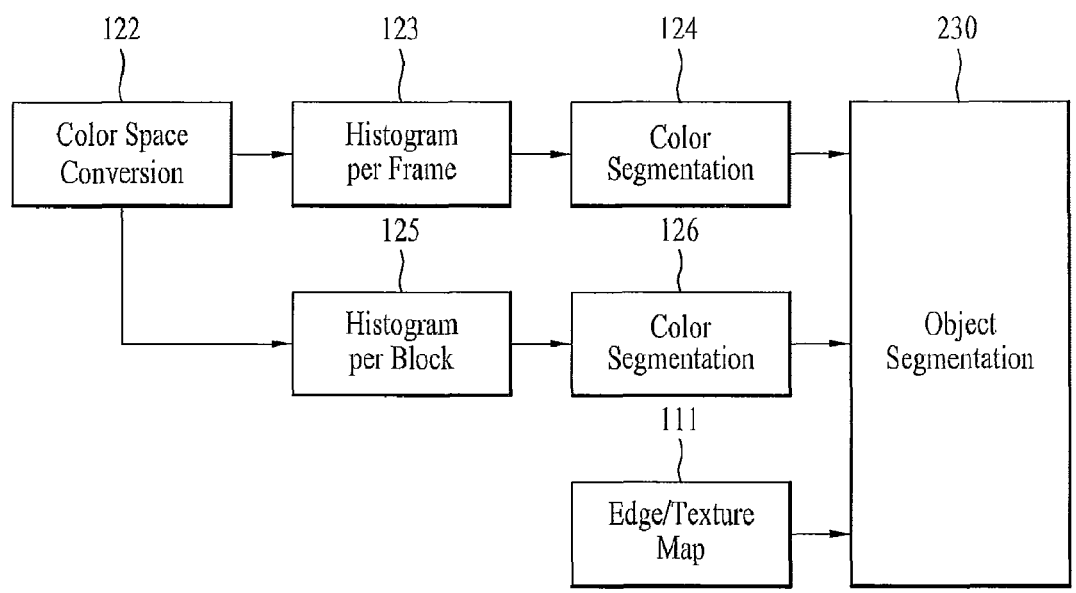
FIG. 10 illustrates a flow chart of an object segmentation method using color segmentation information according to the embodiment of the present invention.

FIG. 10 illustrates a flow chart of an object segmentation 230 method using color segmentation information 121 according to the embodiment of the present invention.

First of all, the present invention performs a color space conversion 122 process by using the color segmentation information 121. This process is performed to convert the color information of the 2D image (20) to color information of the HSV, YUV, RGB, and so on.

Thereafter, in the histogram per frame 123 block, the present invention obtains color distribution throughout the entire frame. Then, the objects of the 2D image (20) are identified in accordance with the color distribution. This process is referred to as a color segmentation 124 process. More specifically, an area having similar colors distributed therein is determined as an object.

Additionally, in the histogram per frame 123 block, the present invention may obtain color distribution of the 2D image (20) in macro block units. In this case, the size of a macro block may be designated, and, based upon the color distribution in macro block units, the object of the 2D image (20) is differentiated. This process is referred to as color segmentation 126.

Accordingly, in the steps 123 and 125 for obtaining a histogram of the 2D image (20), the color distribution standard may be determined differently. For example, in case the color information of the 2D image (20) corresponds to HSV, in cases when the HSV is less than a specific threshold value, the S or V components are categorized separately, and, when the HSV is greater than the threshold value, a histogram is performed with respect to the H component only.

Also, achromatic colors are categorized separately, and, even in case of chromatic colors, components having a weak saturation level or a weak value may be categorized separately.

When it is determined that an edge/texture exists in the entire 2D image (20) or in most of the regions within the 2D image (20), the present invention may locate a dominant color, which is broadly distributed throughout the entire 2D image (121), so that a region having the dominant color most broadly distributed therein can be determined as the background. At this point, the remaining regions may become the foreground.

Figure 11:
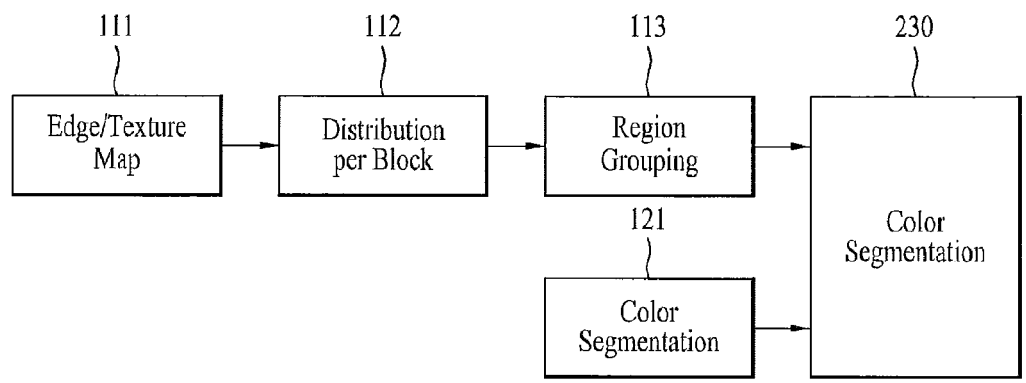
FIG. 11 illustrates a flow chart of an object segmentation method using an edge/texture map according to the embodiment of the present invention.

FIG. 11 illustrates a flow chart of an object segmentation method using an edge/texture 111 map according to the embodiment of the present invention 230 process.

First of all, in a distribution per block 112, the present invention uses the edge/texture map 111 so as to determine whether or not an edge/texture exists in the 2D image (20) in block units.

Also, in the region grouping 113 process, blocks having the edge/texture existing therein are grouped. At this point, for holes corresponding to areas having no edge/texture existing therein, the present invention may perform hole filling by using a morphology method.

Accordingly, by combining the object segmentation 230 method using the color segmentation information 121, as shown in FIG. 10, with the object segmentation 230 method using the edge/texture map 111, as shown in FIG. 11, the present invention may perform a more effective object segmentation 230 process.

Figure 12:
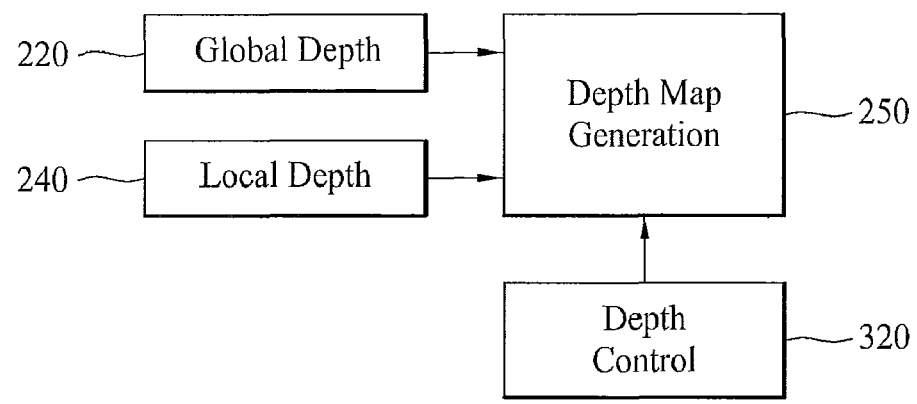
FIG. 12 illustrates a flow chart of a depth map generation method according to the embodiment of the present invention.

FIG. 12 illustrates a flow chart of a depth map generation (250) method according to the embodiment of the present invention.

The present invention generates a final depth map by using the global depth model and the local depth value, which are obtained during the global depth generation 220 process and the local depth generation process 240. This process is referred to as a depth map generation 250 process.

Also, in order to eliminate discontinuity in the 3D effect between the scenes, the present invention performs a step of controlling the final depth map. This process is referred to as a depth control 320 process.

First of all, for example, during the depth map generation 250 process, the final depth map may be generated by simply adding the global depth model and the local depth value, or by calculating a weight average. In another example, in order to eliminate discontinuity in 3D effects between a region of the 2D image having the local depth value assigned thereto and a region of the 2D image that does not have the local depth value assigned thereto, smoothing is performed on the local depth value, and the smoothed local depth value may be combined with the global depth. Examples of the smoothing method include Gaussian filtering or box filtering.

Depth control 320 corresponds to a process for controlling maximum/minimum depth within a scene. Herein, by performing depth control 320, a depth difference between objects or between object and background may be controlled, and the protrusion level of each object towards the viewer may also be controlled.

At this point, by determining a shift factor (bg, b1) and a scale factor (ag, al) for each of the global depth and the local depth, the present invention may control the depth value. In this case, Equation 2 shown below may be used.

$$D_f = a_g(D_g - b_g) + a_l(D_l - b_l)$$ Equation 2

According to another embodiment of the present invention, a reference depth may be obtained by combining the global depth and the local depth that are referred to. And, by determining a shift factor (a) and a scale factor (b) respective to the obtained reference depth, the reference depth may be controlled. Alternatively, the reference depth may also be controlled by determining only the scale factor (a). At this point, the reference global depth and the local depth may be experimentally generated, when generating the depth map for each of the reference global depth and the local depth. In this case, Equation 3 shown below may be used.

$$D_f = (D_{g,ref} + D_{l,ref} - b)$$

$$D_f = a(D_{g,ref} + D_{l,ref})$$ Equation 3

Figure 13:
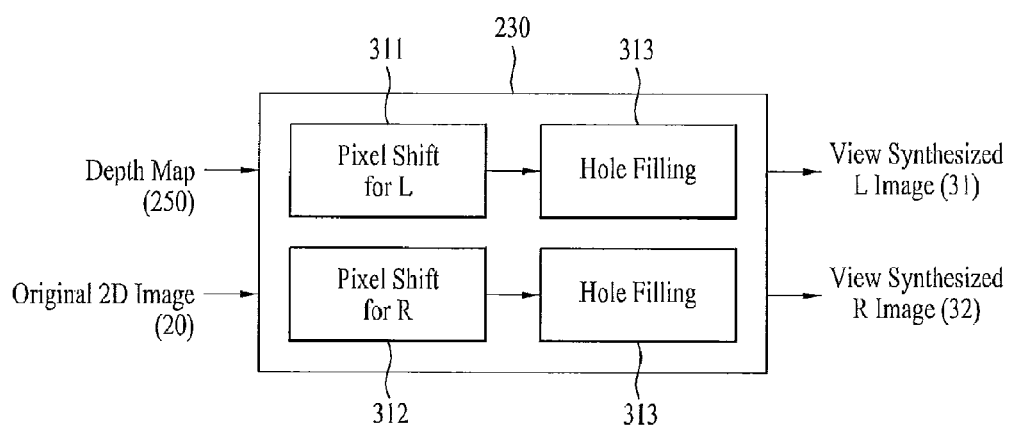
FIG. 13 illustrates a flow chart of a view synthesis method according to the embodiment of the present invention.

FIG. 13 illustrates a flow chart of a view synthesis (310) method according to the embodiment of the present invention.

As described above, the 3D image (30) is configured of a left-eye image and a right-eye image. In the description of the present invention, each of the left-eye image and the right-eye image will be referred to as a view synthesized L image (31) and a view synthesized R image (32).

Accordingly, the view synthesized L/R images (31) and (32) may be generated during the view synthesis 310 process.

Herein, the view synthesis 310 process includes pixel shift 311 and 312 and hole filling 313.

During the pixel shift 311 and 312 process, pixels of the original 2D image (20) may be shifted along the horizontal direction, in accordance with the generated depth map (250), so as to generate the view synthesized L/R images (31) and (32). Also, the view synthesized L image (31) and the view synthesized R image (32) are generated by having the respective pixels shifted to opposite directions. More specifically, during the pixel shift 311 and 312, the location of each pixel within the original 2D image (20) is shifted as much as the depth map (250).

For example, when it is assumed that a depth map (250) value of a pixel point within the original 2D image (20) is equal to 5 pixels, the pixel point corresponding to the view synthesized L image (31) is mapped to a pixel point, which is shifted leftwards by 5 pixels from the pixel point of the original 2D image (20). Conversely, the view synthesized R image (32) is mapped to a pixel point shifted rightwards by 5 pixels from the original 2D image (20).

Furthermore, a floating pixel point shifting method may be used for a more accurate pixel shifting. When performing floating pixel point shifting, shifting may occur in ¼ pixel units or in ⅛ pixel units. Additionally, in order to perform a more accurate floating pixel point shifting, floating pixel point interpolation may be adopted. In a simple method for performing floating pixel point interpolation, bi-linear interpolation, bi-cubic filtering, or poly-phase filtering may be used.

In the hole filling 313 process, the newly created view synthesized L/R images (31) and (32) may fill void (or empty) pixel information. Since the view synthesized L/R images (31) and (32) generated by performing pixel shift 311 and 312 are incomplete images, a pixel cannot be mapped, thereby causing pixels having no pixel information to be generated.

Such pixels are referred to as holes, and the process of filling the holes with pixel information is referred to as the hole filling 313 process.

Hereinafter, the method for performing hole filling 313 will be described in detail.

Figure 14:
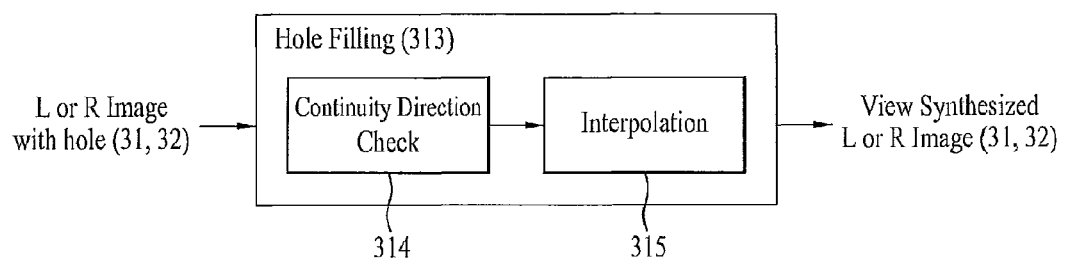
FIG. 14 and FIG. 15 illustrate a hole filling method according to the embodiment of the present invention.
Figure 15:
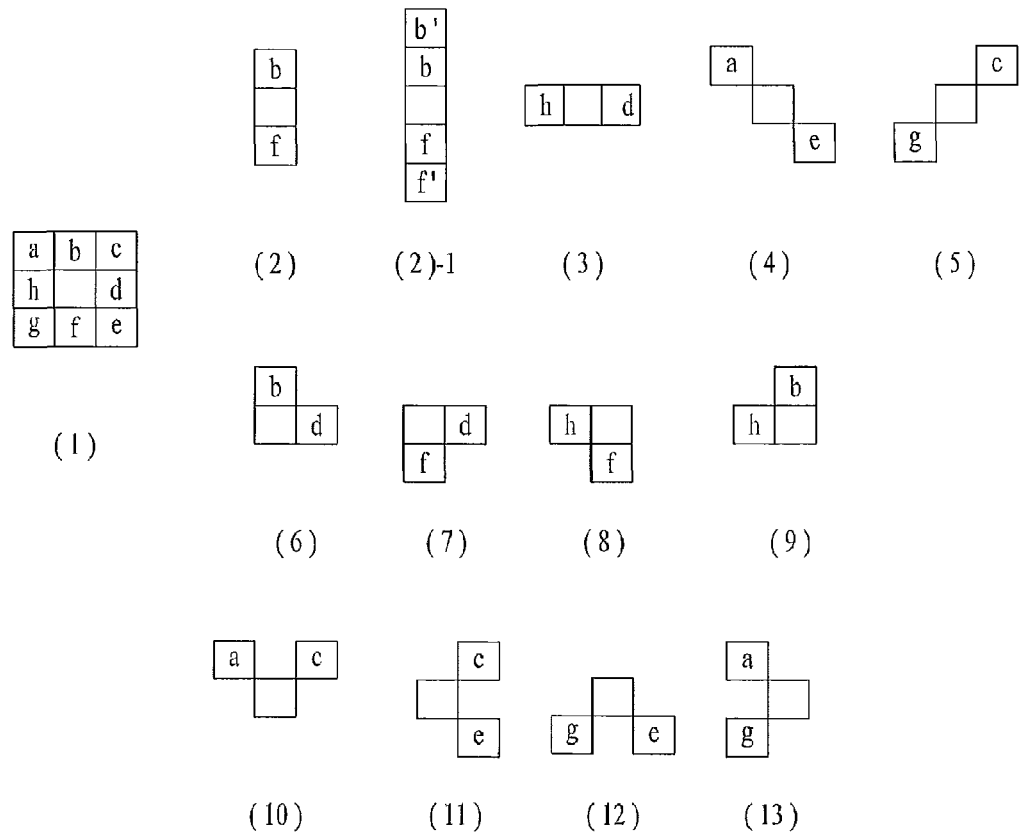

FIG. 14 and FIG. 15 illustrate a hole filling method (313) according to the embodiment of the present invention.

FIG. 14 illustrates a flow chart of a hole filling (313) method according to the embodiment of the present invention. Herein, the hole filling (313) method may include a continuity direction check 314 process and an interpolation 315 process.

First of all, during the continuity direction check 314 process, with reference to the located hole, neighboring pixels having pixel information are detected. And, during the interpolation 315 process, the continuity of the detected pixels is determined, so as to fill the hole with the pixel information.

This process will be described in more detail with reference to FIG. 15. First of all, when a hole is detected, as shown in (1) of FIG. 15, the present invention uses the information of the 8 neighboring pixels from pixel 'a' to pixel 'h' neighboring the hole, so as to fill the detected hole with the pixel information. For example, an average value of the pixel information of the 8 neighboring pixels may be determined as the pixel information for the hole.

Additionally, (2) to (5) of FIG. 15 respectively illustrate examples of using pixel information of pixels that are aligned horizontally, vertically, and diagonally. And, (6) to (13) of FIG. 15 respectively illustrate examples of using pixel information of pixels neighboring the hole so as to form a right angle.

Furthermore, as shown in (2)-1 of FIG. 15, the hole may be filled with the pixel information by using pixel information of neighboring pixels spaced further apart from the hole. This example may only be applied to a case when a gradient of the pixel information belonging to the neighboring pixels is constant.

Figure 16:
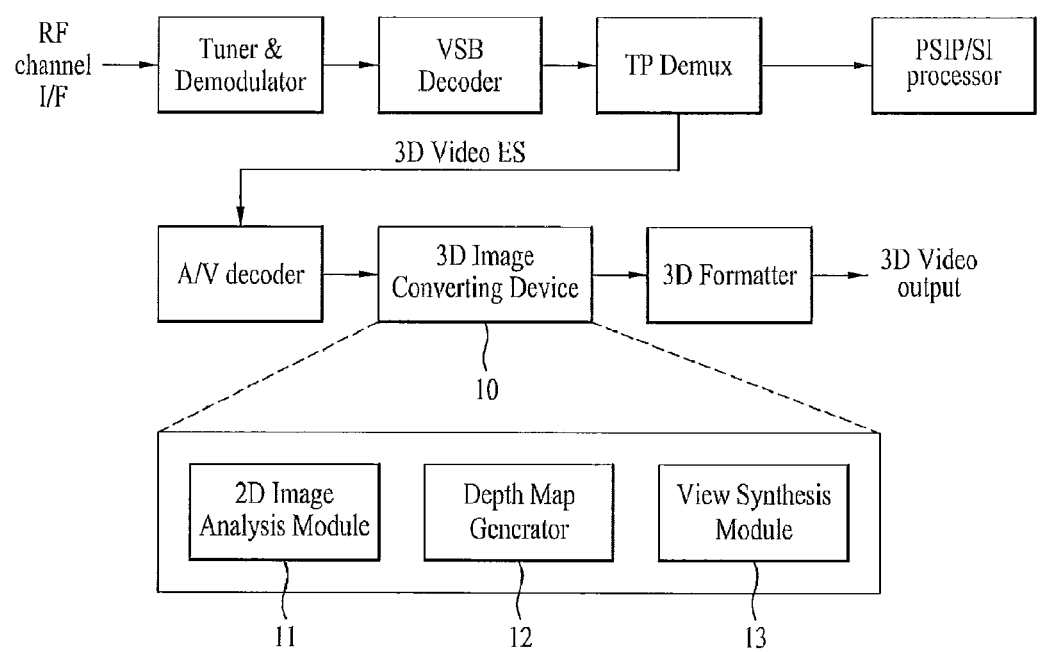
FIG. 16 illustrates a block view showing the structure of a device for converting 3D images according to the embodiment of the present invention.

FIG. 16 illustrates a block view showing the structure of a device for converting 3D images 10 according to the embodiment of the present invention.

Additionally, FIG. 16 illustrates an exemplary structure of a 3D TV including the device for converting 3D images 10. First of all, the 3D TV performs system decoding and video decoding on a broadcast signal that is received by a receiver. Then, a decoded 2D image (20) is inputted to the device for converting 3D images 10. Subsequently, the device for converting 3D images 10 converts the 2D image (20) to a 3D image (30). Thereafter, a 3D formatter converts the 3D image (30) in accordance with a 3D display output, so as to display the converted 3D image (30) to the user (or viewer).

In addition to the 3D TV shown in FIG. 16, the device for converting 3D images may also be included in devices that can display 3D images, such as laptop computers, smartphones, tablet PCs, and so on.

The device for converting 3D images 10 may include a 2D image analysis module 11, a depth map generator 12, and a view synthesis module 13.

Herein, the 2D image analysis module 11 determines a portion of the 2D image where an object, a background, and a vanishing point of the 2D image (20) are located, so as to analyze the whole scene of the 2D image (20).

The 2D image analysis module 11 analyzes the edge/texture, color, blur, occlusion, vanishing point, motion, scene change, and so on of the 2D image (20), so as to generate information on the 2D image (20).

The depth map generator 12 uses the information on the 2D image (20), which is generated by the 2D image analysis module 11, so as to generate a global depth and a local depth of the 2D image (20). Then, the depth map generator 12 uses the generated global depth and local depth to generate a depth map of the 2D image (20). The process of generating the global depth, the local depth, and the depth map has already been described above.

The view synthesis module 13 uses the original 2D image (20) and the generated depth map, so as to generate view synthesized L/R images (31) and (32). More specifically, the view synthesis module 13 may generate the view synthesized L/R images (31) and (32) by performing pixel shift (311 and 312) and hole filling (313) processes. Each process has already been described above in detail.

As described above, the method and device for converting 3D images according to the present invention have the following advantages. According to the present invention, the 2D images may be converted to 3D images without modifying the existing 2D video contents. Also, the 2D graphic contents may be efficiently converted to 3D graphic contents without the need for additional equipments or cost. Furthermore, since 2D graphic contents that are already released to the market are used without any modification, a wider selection of 3D video contents may be provided to the users.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for converting 3-dimensional (3D) images, comprising:
   analyzing a 2-dimensional (2D) image and generating 2D image information;
   generating a global depth and a local depth by using the generated 2D image information, the global depth corresponding to 3D effect pattern information of the 2D image and the local depth corresponding to 3D effect information of an object included in the 2D image, and generating a depth map by using the global depth and the local depth, wherein the depth map corresponds to 3D effect information of the 2D image; and
   generating a 3D image configured of a left-eye image and a right-eye image by using the 2D image and the depth map,
   wherein the step of generating a depth map comprises:
      generating scene analysis information corresponding to the information on the 3D effect respective to one region of the 2D image;
      generating the global depth using the scene analysis information;
      generating object analysis information corresponding to information on an order of diverse 3D effect sizes; and
      generating the local depth by using the object analysis information, and
   wherein the global depth is configured of horizontal 3D effect pattern information of the 2D image and vertical 3D effect pattern information of the 2D image.

2. The method of claim 1, wherein, in the step of generating 2D image information, at least any one of edge information, texture information, color information, blur information, occlusion information, vanishing point information, motion information, and scene change information of the 2D image is generated.

3. The method of claim 2, wherein, in the step of generating scene analysis information, the scene analysis information is generated by detecting a dominant object region having an object displayed therein from the 2D image, by detecting a background region of the 2D image, or by detecting a vanishing point of the 2D image.

4. The method of claim 3, wherein, in the step of generating scene analysis information, a vanishing line of the 2D image is detected by using the edge information or border information of the background region and foreground region, and wherein a point where the vanishing lines meet is detected as the vanishing point.

5. The method of claim 2, wherein, in the step of generating scene analysis information, a dominant edge region is detected from the 2D image by using the edge information, the dominant edge region corresponding to a region having edges distributed therein, wherein a dominant texture region is detected by using the texture information, the dominant texture region corresponding to a region having texture existing therein, and wherein the dominant object region is detected by using the dominant edge region information and the dominant texture region information.

6. The method of claim 2, wherein the step of generating object analysis information comprises:
    differentiating each of the objects of the 2D image from one another by using the edge information or the texture information.

7. The method of claim 1, wherein, in the step of generating a global depth, the global depth is generated by using a global depth of a previous frame.

8. The method of claim 1, wherein the step of generating object analysis information comprises any one of:
    detecting a foreground region having the object displayed therein from the 2D image;
    detecting a background region of the 2D image; and
    detecting an overlaying status of the object.

9. The method of claim 1, wherein the step of generating a 3D image comprises:
    shifting a pixel of the 2D image as much as the depth map value, and generating the left-eye image or the right-eye image; and
    determining pixel information in pixels of the left-eye image and/or the right-eye image by using pixel information of a neighboring pixel.

10. A device for converting 3-dimensional (3D) images, comprising:
    a 2D image analysis module configured to analyze a 2-dimensional (2D) image and to generate 2D image information;
    a depth map generator configured to generate a global depth and a local depth by using the generated 2D image information, the global depth corresponding to 3D effect pattern information of the 2D image and the local depth corresponding to 3D effect information of an object included in the 2D image, and to generate a depth map by using the global depth and the local depth, wherein the depth map corresponds to 3D effect information of the 2D image; and
    a view synthesis module configured to generate a 3D image configured of a left-eye image and a right-eye image by using the 2D image and the depth map,
    wherein the depth map generator generates scene analysis information corresponding to the information on the 3D effect respective to one region of the 2D image, generates the global depth using the scene analysis information, generates object analysis information corresponding to information on an order of diverse 3D effect sizes, and generates the local depth by using the object analysis information, and
    wherein the global depth is configured of horizontal 3D effect pattern information of the 2D image and vertical 3D effect pattern information of the 2D image.

11. The device of claim 10, wherein the 2D image analysis module generates at least any one of edge information, texture information, color information, blur information, occlusion information, vanishing point information, motion information, and scene change information of the 2D image.

12. The device of claim 11, wherein the depth map generator generates the scene analysis information by detecting a dominant object region having an object displayed therein from the 2D image, by detecting a background region of the 2D image, or by detecting a vanishing point of the 2D image.

13. The device of claim 12, wherein the depth map generator detects a vanishing line of the 2D image by using the edge information or border information of the background region and foreground region, and wherein a point where the vanishing lines meet is detected as the vanishing point.

14. The device of claim 11, wherein the depth map generator detects a dominant edge region from the 2D image by using the edge information, the dominant edge region corresponding to a region having edges distributed therein, wherein the depth map generator detects a dominant texture region by using the texture information, the dominant texture region corresponding to a region having texture existing therein, and wherein the depth map generator detects the dominant object region by using the dominant edge region information and the dominant texture region information.

15. The device of claim 11, wherein the depth map generator differentiates each of the objects of the 2D image from one another by using the edge information or the texture information.

16. The device of claim 10, wherein the depth map generator generates the global depth by using a global depth of a previous frame.

17. The device of claim 10, wherein the depth map generator generates the object analysis information by detecting a foreground region having the object displayed therein from the 2D image, by detecting a background region of the 2D image, or by detecting an overlaying status of the object.

18. The device of claim 10, wherein the view synthesis module shifts a pixel of the 2D image as much as the depth map value, so as to generate the left-eye image or the right-eye image, and determines pixel information in pixels of the left-eye image and/or the right-eye image by using pixel information of a neighboring pixel.

* * * * *